United States Patent
Ishihara et al.

(10) Patent No.: US 10,095,919 B2
(45) Date of Patent: Oct. 9, 2018

(54) IMAGE PROCESSING APPARATUS, IMAGE PROCESSING METHOD AND STORAGE MEDIUM TO SUITABLY CLIP A SUBJECT REGION FROM A MOVING IMAGE

(71) Applicant: CASIO COMPUTER CO., LTD., Tokyo (JP)

(72) Inventors: Masanori Ishihara, Hamura (JP); Kei Ideguchi, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 215 days.

(21) Appl. No.: 15/016,025

(22) Filed: Feb. 4, 2016

(65) Prior Publication Data

US 2016/0283813 A1    Sep. 29, 2016

(30) Foreign Application Priority Data

Mar. 23, 2015    (JP) .................... 2015-059349

(51) Int. Cl.
| | |
|---|---|
| G06K 9/00 | (2006.01) |
| G06T 11/60 | (2006.01) |
| G06K 9/32 | (2006.01) |

(52) U.S. Cl.
CPC ....... *G06K 9/00369* (2013.01); *G06K 9/3233* (2013.01); *G06T 11/60* (2013.01); *G06K 2009/3291* (2013.01)

(58) Field of Classification Search
None
See application file for complete search history.

(56) References Cited

U.S. PATENT DOCUMENTS

| | | | | |
|---|---|---|---|---|
| 8,437,524 | B2* | 5/2013 | Bontus ............. | A61B 6/032 382/131 |
| 9,519,993 | B2* | 12/2016 | Kawasaki .......... | G06T 15/08 |
| 2006/0034545 | A1* | 2/2006 | Mattes .............. | G06T 7/33 382/294 |
| 2006/0241379 | A1* | 10/2006 | Greiser ............. | A61B 5/055 600/410 |
| 2009/0310825 | A1* | 12/2009 | Bontus ............. | A61B 6/032 382/107 |
| 2010/0195905 | A1* | 8/2010 | Richter ............ | G06T 5/008 382/167 |
| 2013/0135307 | A1* | 5/2013 | Kawasaki .......... | G06T 15/08 345/424 |

(Continued)

FOREIGN PATENT DOCUMENTS

| | | |
|---|---|---|
| JP | 2008-61184 A | 3/2008 |
| JP | 2012-505037 A | 10/2012 |
| JP | 2015-23294 A | 2/2015 |

*Primary Examiner* — Tahmina Ansari
(74) *Attorney, Agent, or Firm* — Fitch, Even, Tabin & Flannery LLP

(57) ABSTRACT

An image processing apparatus, an image processing method, and a storage medium are shown. According to one implementation, the image processing apparatus includes the following. A detecting unit detects a subject in a moving image. A clipping unit clips a region corresponding to the subject detected by the detecting unit from each frame image composing the moving image. A setting unit sets a planned clipping region to be newly clipped by the clipping unit based on at least one of a position and a size of a region corresponding to the subject already clipped by the clipping unit.

25 Claims, 6 Drawing Sheets

(56) References Cited

U.S. PATENT DOCUMENTS

| | | | | |
|---|---|---|---|---|
| 2014/0105460 A1* | 4/2014 | Sakata | ............... | H04N 5/23219 |
| | | | | 382/103 |
| 2015/0063775 A1* | 3/2015 | Nakamura | ....... | H04N 21/21805 |
| | | | | 386/223 |
| 2015/0262342 A1* | 9/2015 | Matsunaga | ........ | G06K 9/00268 |
| | | | | 382/195 |
| 2016/0283813 A1* | 9/2016 | Ishihara | ............... | G06K 9/3233 |

* cited by examiner

IMAGE PROCESSING APPARATUS, IMAGE PROCESSING METHOD AND STORAGE MEDIUM TO SUITABLY CLIP A SUBJECT REGION FROM A MOVING IMAGE

CROSS-REFERENCE TO RELATED APPLICATIONS

This application is based upon and claims the benefit of priority from the prior Japanese Patent Application No. 2015-059349, filed Mar. 23, 2015, the entire contents of which are incorporated herein by reference.

BACKGROUND OF THE INVENTION

1. Field of the Invention

The present invention relates to an image processing apparatus, an image processing method, and a storage medium to clip a region corresponding to a subject from a moving image.

2. Description of the Related Art

Conventionally, it is well known that there is an image processing apparatus which clips a subject as a tracking target from a moving image and records the subject (for example, Japanese Patent Application Laid-Open Publication No. 2012-205037).

SUMMARY OF THE INVENTION

According to an aspect of the present invention, there is provided an image processing apparatus including:

a detecting unit which detects a subject in a moving image;

a clipping unit which clips a region corresponding to the subject detected by the detecting unit from each frame image composing the moving image; and a setting unit which sets a planned clipping region to be newly clipped by the clipping unit based on at least one of a position and a size of a region corresponding to the subject already clipped by the clipping unit.

According to another aspect of the present invention, there is provided an image processing method using an image processing apparatus, the method including:

detecting a subject in a moving image;

clipping a region corresponding to the subject detected from each frame image composing the moving image; and setting a planned clipping region to be newly clipped based on at least one of a position and a size of a region corresponding to the subject already clipped.

According to another aspect of the preset invention, there is provided a non-transitory computer-readable storage medium having a program stored thereon for controlling a computer to perform image processing performed in an image processing apparatus, wherein the program controls the computer to perform the functions of:

a detecting unit which detects a subject in a moving image;

a clipping unit which clips a region corresponding to the subject detected by the detecting unit from each frame image composing the moving image; and a setting unit which sets a planned clipping region to be newly clipped by the clipping unit based on at least one of a position and a size of a region corresponding to the subject already clipped by the clipping unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A detailed embodiment of the present invention is described with reference to the drawings. However, the scope of the present invention is not limited to the illustrated examples.

Figure 1:
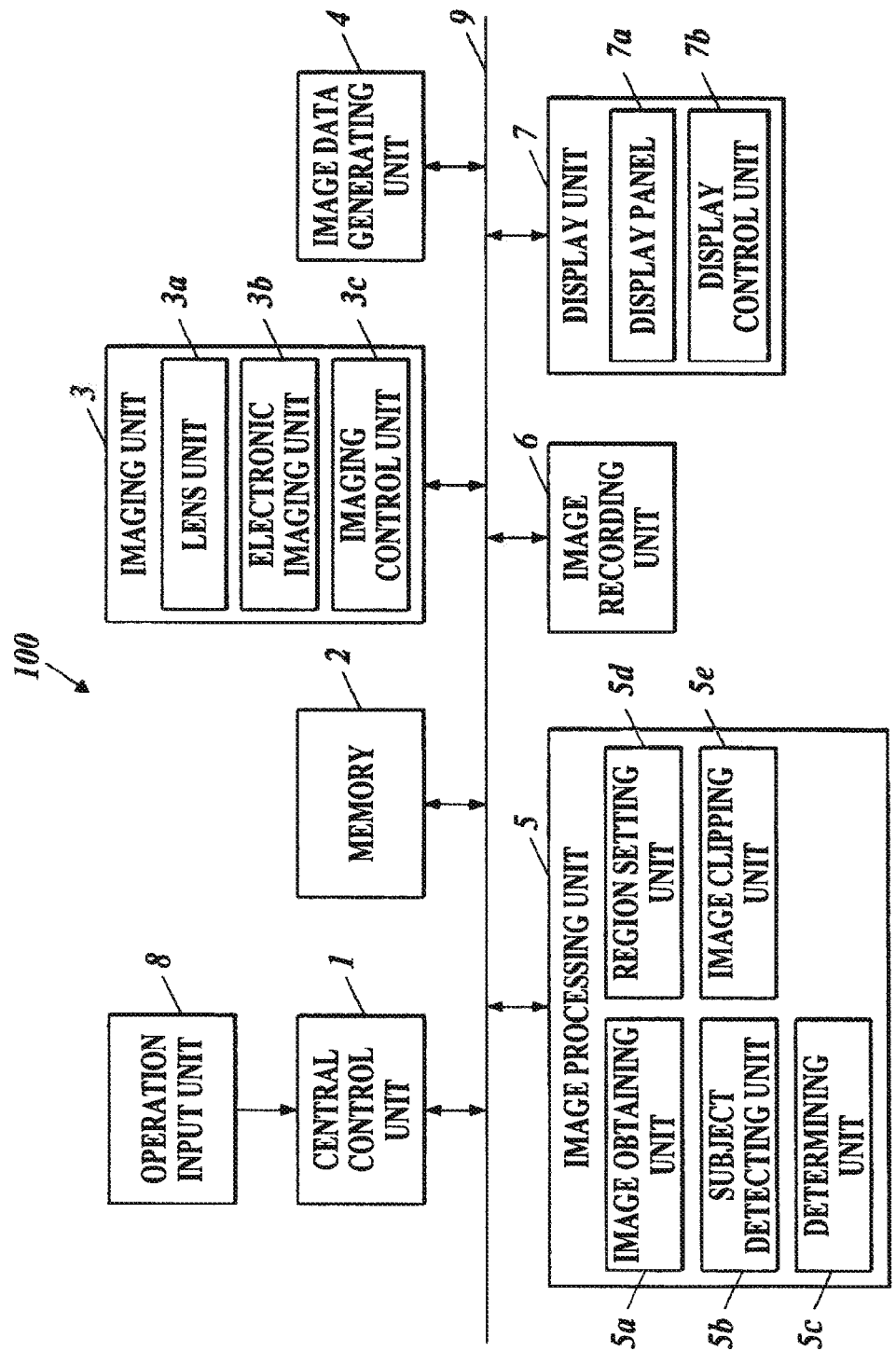
FIG. 1 is a block diagram showing a schematic configuration of an imaging apparatus of an embodiment of the present invention.

FIG. 1 is a block diagram showing a schematic configuration of an imaging apparatus 100 according to an embodiment of the present invention.

As described in FIG. 1, the imaging apparatus 100 of the present embodiment includes, a central control unit 1, a memory 2, an imaging unit 3, an image data generating unit 4, an image processing unit 5, an image recording unit 6, a display unit 7, and an operation/input unit 8.

The central control unit 1, the memory 2, the imaging unit 3, the image data generating unit 4, the image processing unit 5, the image recording unit 6, and the display unit 7 are connected to each other through a bus line 9.

The central control unit 1 controls each unit of the imaging apparatus 100. Specifically, although illustration is omitted, the central control unit 1 includes, a CPU (Central Processing Unit), a RAM (Random Access Memory), and a ROM (Read Only Memory). The central control unit 1 performs various controlling operations according to various processing programs (illustration omitted) for the imaging apparatus 100.

The memory 2 includes, for example, a DRAM (Dynamic Random Access Memory), etc., and temporarily stores data processed by each unit such as the central control unit 1, the image processing unit 5, etc.

Figure 5A:
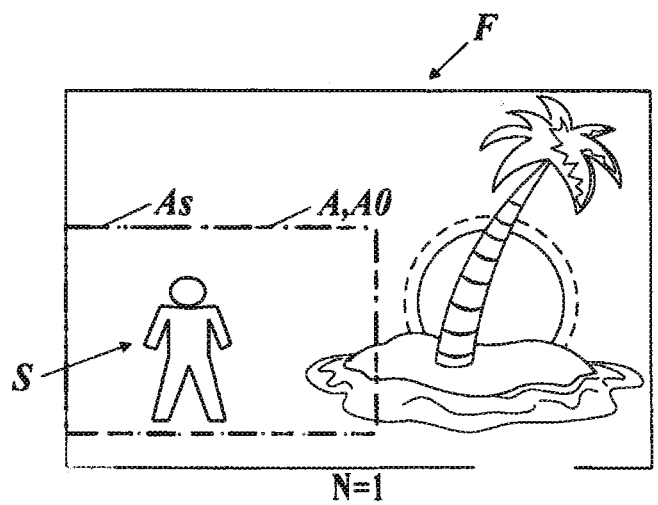
FIG. 5A is a diagram schematically showing an example of a relation between a frame image with a frame number N=1, a subject region, and a subject clipping region according to the image clipping processing shown in FIG. 2.

The imaging unit 3 images, for example, a subject S (see FIG. 5A) such as a human. Specifically, the imaging unit 3 includes a lens unit 3a, an electronic imaging unit 3b, an imaging control unit 3c, and the like.

The lens unit 3a includes, for example, a plurality of lenses such as a zoom lens, a focus lens, etc.

The electronic imaging unit 3b includes, for example, an image sensor such as CMOS (Complementary Metal-oxide Semiconductor) or CCD (Charge Coupled Device), and the optical image which passes through various lenses of the lens unit 3a is converted to a two-dimensional image signal.

Although illustration is omitted, the imaging unit 3 may include a diaphragm to adjust the amount of light which passes through the lens unit 3a.

The imaging control unit 3c controls the imaging of the subject S in the imaging unit 3. In other words, although illustration is omitted, the imaging control unit 3c includes a timing generator and a driver. The imaging control unit 3c drives the electronic imaging unit 3b with the timing generator and the driver for scanning. The imaging control unit 3c uses the electronic imaging unit 3b to convert the optical image to the two-dimensional image signal for each predetermined interval. The imaging control unit 3c reads out a frame image F for each one screen at a time from the imaging region of the electronic imaging unit 3b and outputs the above to the image data generating unit 4.

After suitable gain adjustment is performed for each color component of RGB on the signal of the frame image F transmitted from the electronic imaging unit 3b in the analog value, the above is sampled and held with a sample hold circuit (not shown) and converted to digital data with an A/D convertor (not shown). After color processing including pixel interpolation processing and y correction processing with the color process circuit (not shown), the image data generating unit 4 generates a luminance signal Y and a color difference signal Cb, Cr (YUV data) in digital values. The image data generating unit 4 encodes a plurality of frame images F composing a moving image into a predetermined format (for example, MPEG, motion JPEG, etc.) and generates image data of the moving image.

The image data generating unit 4 transmits the generated image data to the memory 2 used as a buffer memory.

The image processing unit 5 includes, an image obtaining unit 5a, a subject detecting unit 5b, a determining unit 5c, a region setting unit 5d, and an image clipping unit 5e.

Each unit of the image processing unit 5 includes, for example, a predetermined logic circuit, but the configuration is not limited to the above.

The image obtaining unit 5a (an obtaining unit) obtains the moving image which is to be a target of image clipping processing.

In other words, the image obtaining unit 5a obtains from the memory 2, for example, image data of the moving image including the plurality of frame images F imaging the subject S with the imaging unit 3 and generated by the image data generating unit 4.

The image obtaining unit 5a may read out the image data of the moving image recorded in the image recording unit 6 after imaging the subject S with the imaging unit 3 or external devices (not shown), and obtain the above as the target of image clipping processing.

The subject detecting unit 5b (a detecting unit) detects the subject S in the moving image.

In other words, the subject detecting unit 5b performs predetermined subject detecting processing on image data of the moving image including the plurality of frame images F obtained by the image obtaining unit 5a and detects the subject S from each frame image F. Specifically, for example, when an optical tag (not shown) which emits visible light (light within a wavelength of 380 to 780 nm) is attached to the subject S (for example, the human, etc.) the subject detecting unit 5b detects the optical tag which emits light with a predetermined pattern (for example, color pattern or light pattern) in the moving image and specifies the detecting position. Then, the subject detecting unit 5b performs predetermined subject detecting processing (for example, face detecting processing, etc.) on each frame image F with the specified detecting position of the optical tag as the reference and detects the position of the subject S or the region including the subject S from each frame image F. Alternatively, the subject detecting unit 5b may set the position information of the subject S or image information such as the luminance information or the color information of the region including the subject S detected from one frame image F among the plurality of frame images F composing the moving image as a tracking target and the subject S may be detected in the other frame images F.

The subject detecting unit 5b may detect a plurality of subjects Ss from each frame image F or the region including the plurality of subjects Ss.

The face detecting processing is a well-known technique, and therefore, detailed description is omitted here. The face detecting processing is shown as an example of the subject detecting processing, but this is merely one example, and the face detecting processing is not limited to the above. For example, predetermined image recognition techniques such as edge detecting processing, feature extraction processing, and the like can be used and the processing can be suitably changed freely.

The determining unit 5c (a determining unit) determines whether the subject S is detected by the subject detecting unit 5b.

In other words, the determining unit 5c determines whether the subject S is detected by the subject detecting unit 5b from the one frame image F composing the moving image. Specifically, for example, the determining unit 5c determines whether the subject S is detected according to whether the optical tag attached to the subject S or the region including the subject S is detected from each frame image F by the subject detecting unit 5b.

The region setting unit 5d (a setting unit) sets a planned clipping region A0 (see FIG. 5A) which is to be clipped by the image clipping unit 5e from each frame image F composing the moving image.

In other words, the region setting unit 5d sets the planned clipping region A0 to be newly clipped by the image clipping unit 5e based on at least one of a position and a size of the subject clipping region A (see FIG. 5A) already clipped by the image clipping unit 5e. Specifically, the region setting unit 5d interpolates and sets the position of the newly planned clipping region A0 based on the temporal change of the position of the subject clipping region A already clipped by the image clipping unit 5e. Alternatively, the region setting unit 5d interpolates and sets the size of the newly planned clipping region A0 based on the temporal change of the size of the subject clipping region A already clipped by the image clipping unit 5e.

For example, the region setting unit 5d obtains coordinates of the position of the plurality of subject clipping regions A (for example, a reference position such as an upper left pixel) already clipped by the image clipping region 5e from the memory 2, and calculates a representative value (for example, average value, etc.) of a distance between position coordinates of the subject clipping regions A adjacent to each other in a time axis. Then, the region setting unit 5d performs predetermined calculation based on the calculated representative value and calculates a linear interpolation condition to interpolate and set the position and the size of the newly planned clipping region A0 by linear interpolation.

Here, when the size of the plurality of subject clipping regions A changes, the position of the subject clipping region A also changes. Therefore, the region setting unit 5d uses the representative value of the distance between the position coordinates of the subject clipping regions A adjacent to each other in the time axis to calculate the linear interpolation condition. For example, the result of comparing the representative value of the size of the plurality of subject clipping regions A with a predetermined size may be used to calculate the linear interpolation condition.

Linear interpolation is a well-known technique and therefore the detailed description is omitted here.

When the determining unit 5c determines that the subject S is detected from the one frame image F which is the processing target, the region setting unit 5d obtains the position coordinates of the subject S detected by the subject detecting unit 5b, and sets the planned clipping region A0 newly clipped from the one frame image F by the image clipping unit 5e based on the temporal change of the position and the size of the subject clipping region A clipped by the image clipping unit 5e from another frame image F before the one frame image F composing the moving image. For example, here, when the subject detecting unit 5b detects one object S from the one frame image F, the region setting unit 5d calculates the difference between the maximum value and the minimum value of the x coordinate and the y coordinate of the position coordinates of the one subject S, in other words, calculates the pixel number in the x axis direction and the y axis direction as the subject size. Then, the region setting unit 5d specifies the subject region As from the minimum value of the position coordinates of the subject S and the calculated subject size. For example, when the subject detecting unit 5b detects the plurality of subjects Ss from the one frame image F, the region setting unit 5d obtains the position coordinates of each of the plurality of subjects Ss and calculates the difference between the maximum value and the minimum value of the x coordinate and the y coordinate as the subject size. For example, when 3 subjects Ss are detected, and supposing the values are as follows, the position coordinates of a first subject S is (30, 390), the position coordinates of a second subject S is (100, 50), the position coordinates of a third subject S is (600, 200), the maximum value of the x coordinate is 600, the minimum value of the x coordinate is 30, the maximum value of the y coordinate is 390 and the minimum value of the y coordinate is 50. The subject size is as follows, the pixel number in the x axis direction is 570, in which the minimum value 30 is subtracted from the maximum value 600, and the pixel number in the y axis direction is 340, in which the minimum value 50 is subtracted from the maximum value 390. Then, the region setting unit 5d specifies the subject region As from the minimum value of the position coordinates of the plurality of subjects Ss and the calculated subject size.

Here, the region setting unit 5d may consider a shake when the subject S is imaged with the imaging unit 3, and the subject region As may be set adding a play region on an outer side from a center of gravity as a center. The size of the added play region may be changed according to the position or the size of the subject region As or can be a certain size obtained from experience.

Figure 5B:
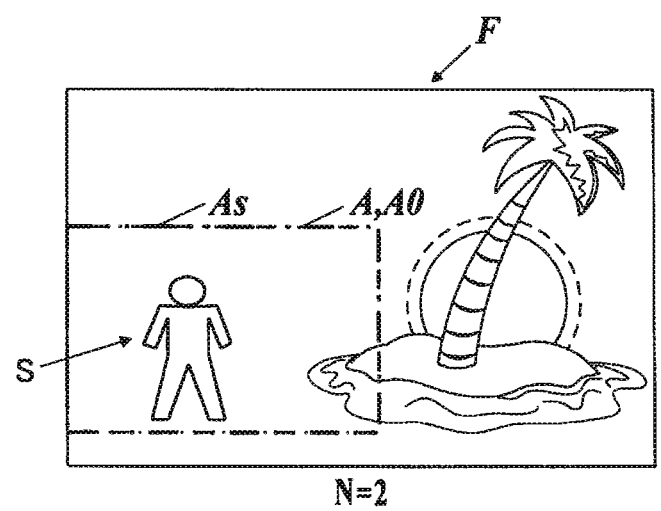
FIG. 5B is a diagram schematically showing an example of a relation between a frame image with a frame number N=2, a subject region, and a subject clipping region according to the image clipping processing shown in FIG. 2.

Then, the region setting unit 5d determines whether there is the center of gravity (the center in the x axis direction and the y axis direction) of the subject clipping region A clipped from the one frame image F before (for example, first frame image N=1; see FIG. 5A) the one frame image F (for example, second frame image N=2; see FIG. 5B) in the specified subject region As. Here, when it is determined that there is the center of gravity of the subject clipping region A clipped from the one frame image F before in the subject region As, the region setting unit 5d sets the center of gravity of the subject clipping region A clipped from the one frame image F before as the center of gravity of the planned clipping region A0 newly clipped from the one frame image F. Alternatively, when it is determined that the center of gravity of the subject clipping region A clipped from the one frame image F before is not in the subject region As, the region setting unit 5d sets the center of gravity of the planned clipping region A0 newly clipped from the one frame image F based on the linear interpolation condition.

When the play region is added to the subject region As, the region setting unit 5d can determine whether the center of gravity of the subject clipping region A clipped from the one frame image F before is in the play region of the specified subject region As.

Further, other than the above methods of determination, the region setting unit 5d may determine whether the entire subject clipping region A clipped from the one frame image F before is in the specified subject region As.

The region setting unit 5d determines whether the size of the specified subject region As is larger than the size of the subject clipping region A clipped from the one frame image F before. Here, when it is determined that the size of the subject region As is larger than the size of the subject clipping region A clipped from the one frame image F before, the region setting unit 5d sets the size of the planned clipping region A0 newly clipped from the one frame image F to be larger than the size of the subject clipping region A clipped from the one frame image F before based on the linear interpolation condition. When it is determined that the size of the subject region As is not larger than the size of the subject clipping region A clipped from the one frame image F before, the region setting unit 5d sets the size of the planned clipping region A0 newly clipped from the one frame image F to be equal to or smaller than the size of the subject clipping region A clipped from the one frame image F before based on the linear interpolation condition.

When it is determined that the size of the subject region As is the same size as the size of the subject clipping region A clipped from the one frame image F before, the region setting unit 5d may set the size of the planned clipping region A0 newly clipped from the one frame image F to be the same as the size of the subject clipping region A clipped from the one frame image F before.

When it is determined that the determining unit 5c did not detect the subject S from the one frame image F which is the processing target, the region setting unit 5d sets the planned clipping region A0 newly clipped from the one frame image F by the image clipping unit 5e based on the temporal change of the position and the size of the subject clipping region A clipped by the image clipping unit 5e from the another frame image F composing the moving image before the one frame image F. Here, the region setting unit 5d may set the center of gravity and the size of the newly planned clipping region A0 clipped from the one frame image F according to the size of the provisional planned clipping region A0 set according to the condition specified in advance (for example, whether there is zoom out, zoom magnification, etc.).

The region setting unit 5d may set the planned clipping region A0 so that an aspect ratio of the subject clipping region A clipped from each frame image F composing the moving image is a certain value. For example, when the aspect ratio is 9:16, the region setting unit 5d divides the pixel number in the y axis direction by 9, adds an invariable for counting up (for example, 0.5, etc.), and multiplies 9 to the rounded value. Similarly, the region setting unit 5d divides the pixel number in the x axis direction by 16, adds an invariable for counting up (for example, 0.5, etc.), and multiplies 16 to the rounded value.

When the set center of gravity of the planned clipping region A0 is close to an edge of the frame image F (for example, left edge, etc.), and the planned clipping region A0 is set outside the edge, the region setting unit 5d may move the planned clipping region A0 in a direction away from the edge of the frame image F while maintaining the aspect ratio of the planned clipping region A0 and set the planned clipping region A0.

The region setting unit 5d uses linear interpolation to set the planned clipping region A0, however, this is one example and the present embodiment is not limited to the above. For example, other interpolation methods such as cubic curve interpolation may be used.

The image clipping unit 5e (a clipping unit) clips the region (subject clipping region A) corresponding to the subject S detected by the subject detecting unit 5b from each frame image F composing the moving image.

In other words, the image clipping unit 5e clips the planned clipping region A0 set by the region setting unit 5d from the one frame image F which is the processing target as the subject clipping region A.

Since the planned clipping region A0 is set by the region setting unit 5d and clipped even when the subject S is not detected by the subject detecting unit 5b, the subject S may or may not be included in the subject clipping region A.

For example, the image recording unit 6 is composed of a nonvolatile memory (flash memory). The image recording unit 6 records image data of various images encoded by a predetermined encoding method by the encoding unit (not shown) of the image data generating unit 4.

Specifically, for example, the image recording unit 6 records image data of the moving image of the subject S imaged by the imaging unit 3 and the image data of trimming moving images of the subject clipping region A clipped from the moving image.

The image recording unit 6, for example, may be a detachable recording medium (not shown), and readout of data from the attached recording medium and writing of the data on the recording medium can be performed.

The display unit 7 displays static images and moving images. Specifically, the display unit 7 includes a display panel 7a and a display control unit 7b.

The display panel 7a displays the image in the display region. Specifically, the display unit 7 sequentially updates and displays at a predetermined playing frame rate the plurality of frame images F generated by the imaging unit 3 imaging the subject S in the static image imaging mode or the moving image imaging mode.

For example, the display panel 7a may be but is not limited to a liquid crystal display panel and an organic EL display panel.

The display control unit 7b controls display of a predetermined image on a display screen of the display panel 7a based on the image data of a predetermined size read out from the image recording unit 6 and decoded by the image processing unit 5. Specifically, the display control unit 7b includes a VRAM (Video Random Access Memory), a VRAM controller, and a digital video encoder. The digital video encoder reads out the luminance signal Y and the color difference signal Cb and Cr decoded by the image processing unit 5 and stored in the VRAM (not shown) from the VRAM through the VRAM controller, generates a video signal from the above data and outputs the signal to the display panel 7a.

The operation input unit 8 is for inputting various instructions to the apparatus main body.

Specifically, for example, the operation input unit 8 includes an operation unit (not shown) including, for example, a cursor button of up, down, left, and right, and an enter button for instructions to select the mode or function.

Then, when the user operates various buttons of the operation unit, the operation input unit 8 outputs the operation instruction according to the operated button to the central control unit 1. The central control unit 1 controls each section to perform predetermined operation (for example, imaging, etc. of the subject S) according to the input operation instruction output from the operation input unit 8.

The operation input unit 8 may include a touch panel (not shown) provided as one with the display panel 7a of the display unit 7.

<Image Clipping Processing>

Next, the image clipping processing is described with reference to FIG. 2 to FIG. 6.

Figure 2:
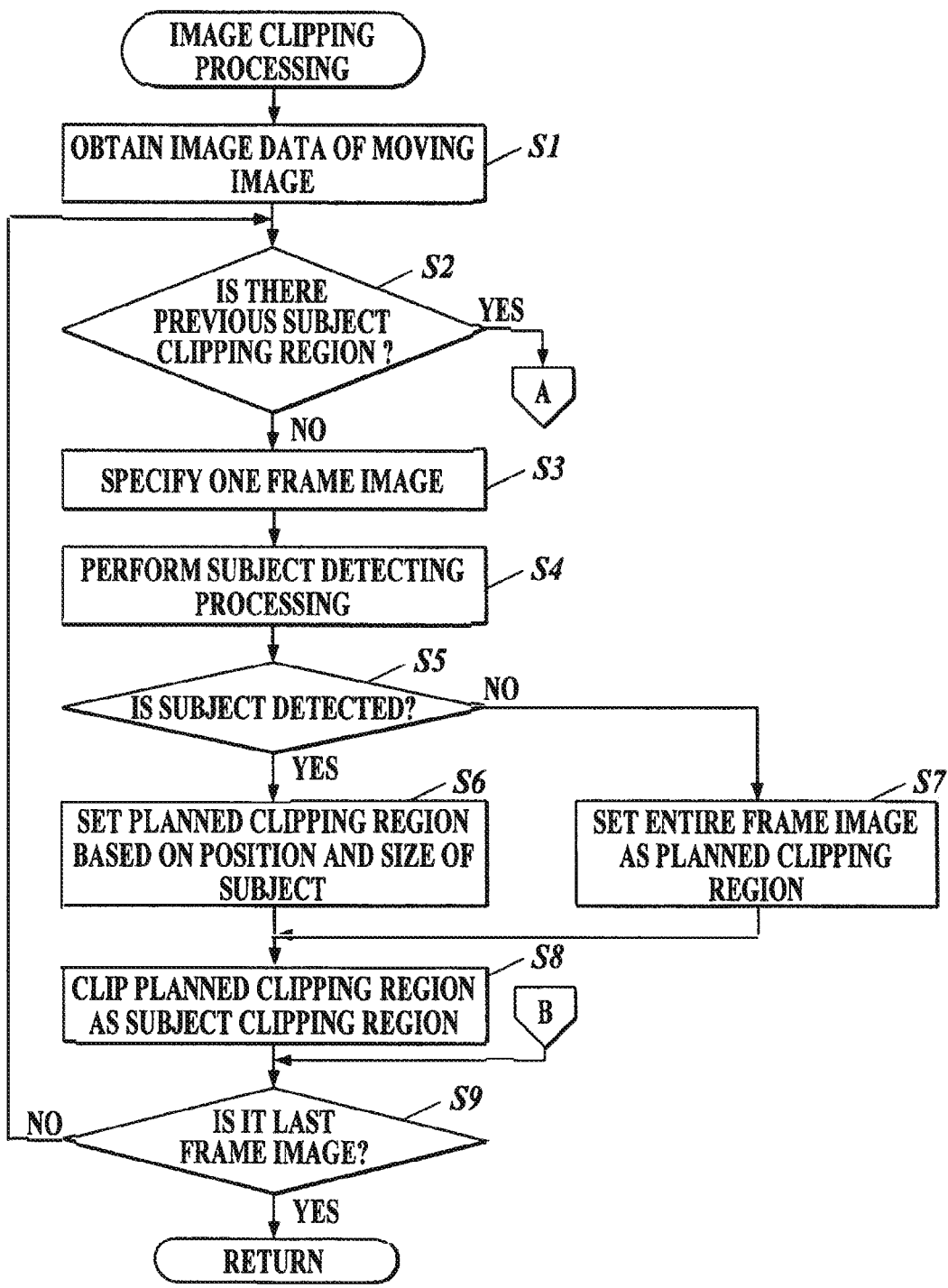
FIG. 2 is a flowchart showing an example of operation of an image clipping processing by the imaging apparatus shown in FIG. 1.
Figure 3:
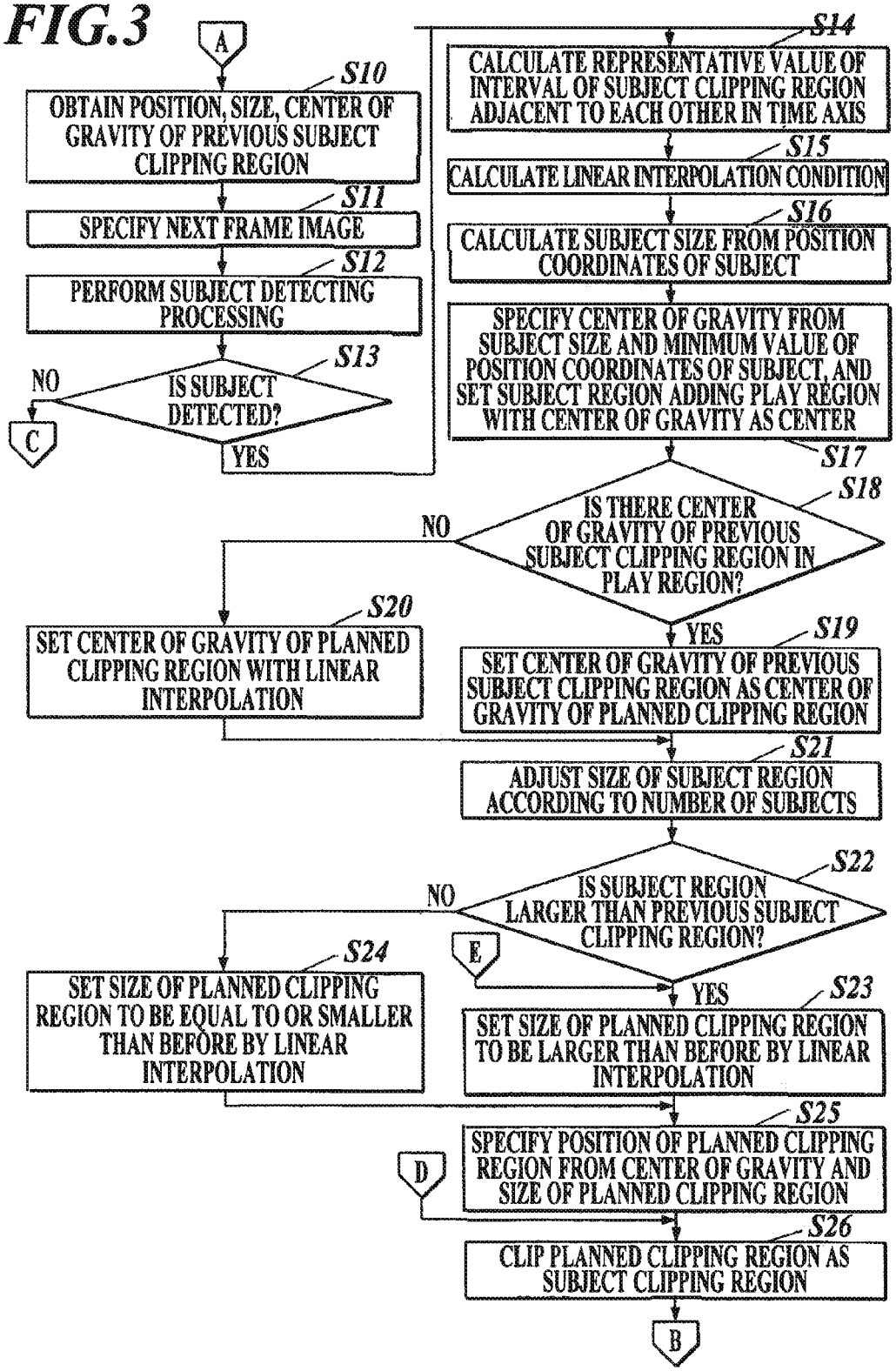
FIG. 3 is a flowchart showing a continuation of the image clipping processing shown in FIG. 2.
Figure 4:
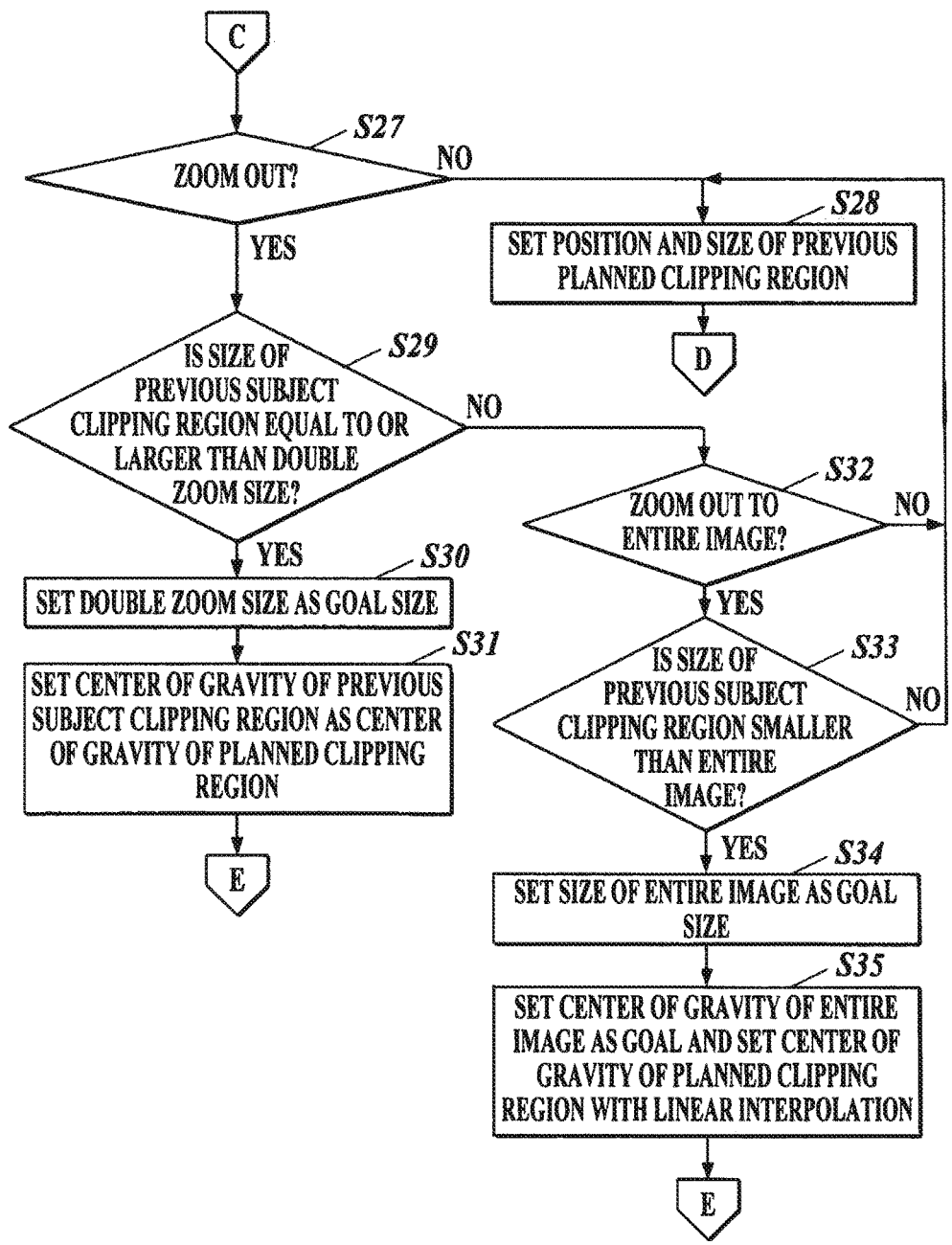
FIG. 4 is a flowchart showing a continuation of the image clipping processing shown in FIG. 3.

FIG. 2 to FIG. 4 are flowcharts showing an example of an operation regarding the image clipping processing. FIG. 5A to FIG. 5C and FIG. 6A to FIG. 6B are diagrams schematically showing an example of a relation between the frame images F of the frame numbers N=1 to 5, the subject region As, and the subject clipping region A.

FIG. 5A to FIG. 5C and FIG. 6A and FIG. 6B show the planned clipping region A0 and the subject clipping region A with an alternate long and short dash line, and the subject region As with a long and two short dash line.

The image clipping processing described below is processing performed when an image clipping mode is selected from a plurality of operation modes displayed on a menu screen (not shown) based on a predetermined operation of the operation input unit 8 by the user. The image recording unit 6 records the image data of the moving image of the subject S imaged by the imaging unit 3.

As shown in FIG. 2, first, the image obtaining unit 5a of the image processing unit 5 obtains the image data of the moving image including the plurality of frame images F from the image recording unit 6 (step S1).

Next, the image processing unit 5 determines whether there is the previous subject clipping region A (step S2). For example, the image processing unit 5 determines whether information such as the position, the size, or the center of gravity of the subject clipping region A previously clipped in the image clipping processing is stored in a predetermined storage region of the memory 2.

Here, when the frame image F (see FIG. 5A) of the plurality of frame images F of the moving image with the first frame number (N=1) is the processing target, since the clipping of the subject clipping region A is not yet performed, the image processing unit 5 determines there is no previous subject clipping region A.

In step S2, when it is determined that there is no previous subject clipping region A (step S2; NO), the image processing unit 5 specifies any one frame image F (for example, the first frame image F, etc.) among the plurality of frame images F of the moving image as the processing target (step S3).

Next, the subject detecting unit 5b performs the predetermined subject detecting processing on the image data of the one frame image F specified as the processing target (step S4). In the subject detecting processing, for example, the optical tag attached to the subject S may be used to detect the subject S from the frame image F.

Next, the determining unit 5c determines whether the subject S is detected by the subject detecting unit 5b from the processing target frame image F (step S5).

Here, when it is determined that the subject detecting unit 5b detected the subject S (step S5; YES), the region setting unit 5d sets the planned clipping region A0 in the size enough to include the subject S with the subject S as the center, based on the position and the size of the subject S detected by the subject detecting unit 5b (step S6).

When it is determined that the subject detecting unit 5b did not detect the subject S (step S5; NO), the region setting unit 5d sets the entire frame image F as the planned clipping region A0 (step S7).

Next, the image clipping unit 5e clips the planned clipping region A0 set by the region setting unit 5d from the one frame image F as the subject clipping region A (step S8). Then, the image clipping region 5e outputs the information such as the position, the size, and the center of gravity of the clipped subject clipping region A to the memory 2. Information such as the position, the size, and the center of gravity of the subject clipping region A is stored in the predetermined storage region of the memory 2 corresponded with the frame number (N=1) of the frame image F.

Next, the image processing unit 5 determines whether the processing target frame image F is the last frame image F among the plurality of frame images F composing the moving image (step S9).

Here, when it is determined that the processing target frame image F is not the last frame image F (step S9; NO), the image processing unit 5 returns to the processing of step S2, and similar to the above, determines whether there is a previous subject clipping region A (step S2).

In step S2, when it is determined that there is a previous subject clipping region A (step S2; YES), as shown in FIG. 3, the image processing unit 5 obtains the information such as the position, the size, and the center of gravity of the previously clipped subject clipping region A from the memory 2 (step S10), and specifies the frame image F among the plurality of frame images F of the moving image with the next frame number (for example, the frame image F with the second frame number (N=2); see FIG. 5B) as the processing target (step S11).

Next, the subject detecting unit 5b performs the predetermined subject detecting processing on the image data of the next frame image F specified as the processing target (step S12). The subject detecting processing is substantially the same as the subject detecting processing in step S4 described above.

Next, the determining unit 5c determines whether the subject S is detected by the subject detecting unit 5b in the processing target frame image F (step S13).

In step S13, when it is determined that the subject S is detected by the subject detecting unit 5b (step S13; YES), the region setting unit 5d calculates the representative value (for example, the average value, etc.) of the distance between position coordinates of subject clipping regions A adjacent to each other in the time axis within a predetermined term stored in the memory 2 (step S14). For example, when the second frame image F is the processing target, since only the position of the subject clipping region A clipped from the first frame image F is stored in the memory 2, the position of the subject clipping region A of the first frame image F and the position of the subject S detected by the subject detecting unit 5b from the processing target frame image F may be used.

Then, the region setting unit 5d performs predetermined calculation based on the calculated representative value of the distance between subject clipping regions A, and calculates the linear interpolation condition for interpolating and setting the position and the size of the newly planned clipping region A0 (step S15).

Next, the region setting unit 5d calculates the subject size based on the maximum value and the minimum value of the x coordinate and the y coordinate of the position coordinates of the subject S detected by the subject detecting unit 5b (step S16). For example, when the subject detecting unit 5b detects the one subject S, the region setting unit 5d calculates the difference between the maximum value and the minimum value of the x coordinate and the y coordinate of the position coordinates of the one subject S as the subject size, and when the plurality of subjects Ss are detected, the position coordinates of each of the plurality of subjects Ss are obtained, and the difference between the maximum value and the minimum value of the x coordinate and the y coordinate is calculated as the subject size.

Next, the region setting unit 5d specifies the center of gravity of the subject region As from the calculated subject size and the minimum value of the position coordinates of the subject S, and specifies the subject region As attached with the play region with the center of gravity as the center (step S17).

Next, the region setting unit 5d determines whether the center of gravity of the previous subject clipping region A is in the play region of the specified subject region As (step S18).

In step S18, when it is determined that the center of gravity of the previous subject clipping region A is in the play region (step S18; YES), the region setting unit 5d sets the center of gravity of the previous subject clipping region A as the center of gravity of the planned clipping region A0 newly clipped from the processing target frame image F (step S19).

When it is judged that the center of gravity of the previous subject clipping region A is not in the play region (step S18; NO), the region setting unit 5d sets the center of gravity of the planned clipping region A0 newly clipped from the frame image F of the processing target based on the linear interpolation condition calculated in step S15 (step S20).

Then, according to the number of subjects Ss detected by the subject detecting unit 5b, for example, the region setting unit 5d adjusts the size of the subject region As to be larger as the number of subjects Ss becomes larger (step S21).

Then, the region setting unit 5*d* determines whether the size of the subject region As after size adjustment is larger than the size of the previous subject clipping region A (step S22).

In step S22, when it is determined that the size of the subject region As is larger than the size of the previous subject clipping region A (step S22; YES), the region setting unit 5*d* sets the size of the planned clipping region A0 newly clipped from the processing target frame image F to be larger than the size of the previous subject clipping region A based on the linear interpolation condition calculated in step S15 (step S23).

When it is determined that the size of the subject region As is not larger than the size of the previous subject clipping region A (step S22; NO), the region setting unit 5*d* sets the size of the planned clipping region A0 newly clipped from the frame image F of the processing target to be equal to or smaller than the size of the previous subject clipping region A based on the linear interpolation condition calculated in step S15 (step S24).

Next, the region setting unit 5*d* specifies the position of the planned clipping region A0 (for example, the reference position of the upper left pixel, etc.) from the set center of gravity and the size of the set planned clipping region A0 (step S25).

The image clipping region 5*e* clips the planned clipping region A0 set by the region setting unit 5*d* from the processing target frame image F as the target clipping region A (step S26). Then, similar to step S8, the image clipping unit 5*e* outputs information such as the position, the size, the center of gravity, etc. of the clipped subject clipping region A to the memory 2. The information such as the position, the size, and the center of gravity of the subject clipping region A is corresponded with the frame number (N=2) of the frame image F and stored in the predetermined storage region of the memory 2.

Then, as shown in FIG. 2, the image processing unit 5 returns the processing to step S9, and similar to the above, determines whether the processing target frame image F is the last frame image F among the plurality of frame images F composing the moving image (step S9).

Here, when it is determined that the processing target frame image F is not the last frame image F (step S9; NO), the image processing unit 5 returns the processing to step S2, and similar to the above, determines whether there is the previous subject clipping region A (step S2).

The above processing is repeated until it is determined that the processing target frame image F is the last frame image F (step S9; YES) among the plurality of frame images F composing the moving image in step S9.

Figure 5C:
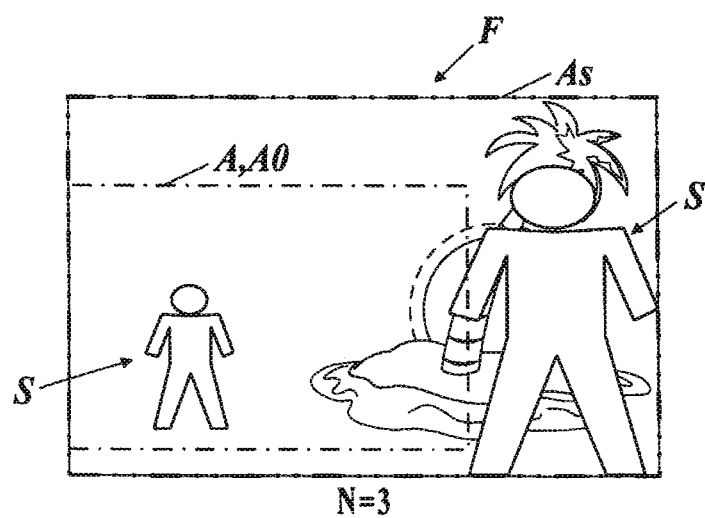
FIG. 5C is a diagram schematically showing an example of a relation between a frame image with a frame number N=3, a subject region, and a subject clipping region according to the image clipping processing shown in FIG. 2.
Figure 6A:
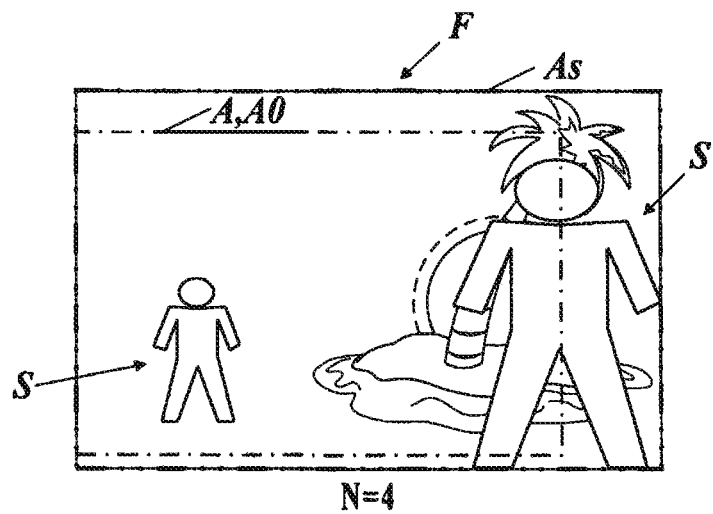
FIG. 6A is a diagram schematically showing an example of a relation between a frame image with a frame number N=4, a subject region, and a subject clipping region according to the image clipping processing shown in FIG. 2.
Figure 6B:
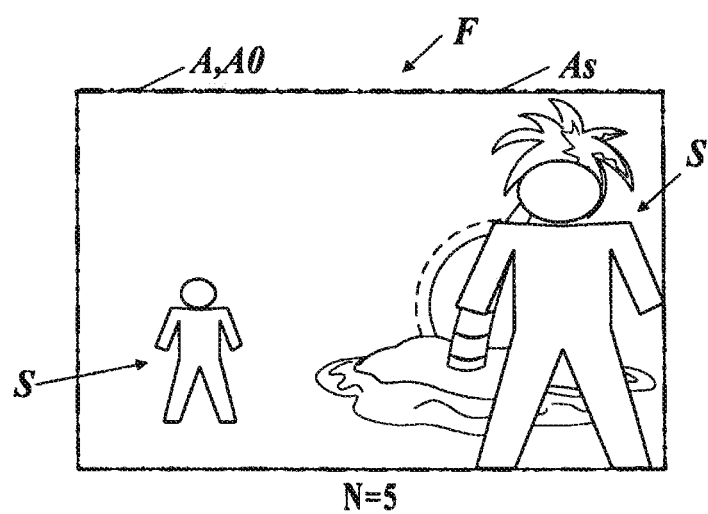
FIG. 6B is a diagram schematically showing an example of a relation between a frame image with a frame number N=5, a subject region, and a subject clipping region according to the image clipping processing shown in FIG. 2.

For example, as shown in FIG. 5A to FIG. 5C and FIG. 6A and FIG. 6B, even when the one subject S is detected in the first frame image F with the frame number N=1 and the next frame image F with the frame number N=2, and two subjects Ss, Ss are detected in the third frame image F with the frame number N=3, the position and the size of the subject clipping region A (planned clipping region A0) does not drastically change in the third frame image F with the frame number N=3 and the position and the size of the subject clipping region A (planned clipping region A0) is set interpolating considering the temporal change of the position and the size of the subject clipping region A already clipped (see FIG. 5C). In other words, even if the position and the size of the subject region As drastically changes in the processing target frame image F, the position and the size of the subject clipping region A actually clipped from the frame image F changes gradually between adjacent frame images F (see FIG. 5B to FIG. 6B).

In step S13, when it is determined that the subject S is not detected by the subject detecting unit 5*b* (step S13; NO), the image processing unit 5 determines whether to zoom out according to previously specified conditions (step S27).

Here, when it is determined not to zoom out (step S27; NO), the region setting unit 5*d* sets the position and the size of the previously set planned clipping region A0 as the position and the size of the planned clipping region A0 newly clipped from the processing target frame image F (step S28).

Then, the image processing unit 5 advances the processing to step S26, and performs the processing thereafter. In other words, in step S26, the image clipping unit 5*e* clips the planned clipping region A0 set by the region setting unit 5*d* from the processing target frame image F as the subject clipping region A.

In step S27, when it is determined to zoom out (step S27; YES), the image processing unit 5 determines whether the size of the subject clipping region A previously clipped is equal to or larger than a double zoomed size (square measure ratio 1/4) zooming so that the size is double vertically and horizontally (step S29).

In step S29, when it is determined that the size of the previously clipped subject clipping region A is equal to or larger than the double zoom size (step S29; YES), the region setting unit 5*d* sets the double zoom size as the goal size of the planned clipping region A0 newly clipped from the processing target frame image F (step S30). Next, the region setting unit 5*d* sets the center of gravity of the previous subject clipping region A as the center of gravity of the planned clipping region A0 newly clipped from the processing target frame image F (step S31).

Then, the image processing unit 5 advances the processing to step S23, and performs the processing thereafter. In other words, in step S23, the region setting unit 5*d* sets the size of the planned clipping region A0 newly clipped from the processing target frame image F to be larger than the size of the previous subject clipping region A based on the linear interpolation condition calculated in step S15. In step S25, the position of the planned clipping region A0 is specified from the center of gravity and the size of the set planned clipping region A0.

Then, in step S26, the image clipping region 5*e* clips the planned clipping region A0 set in the region setting unit 5*d* from the processing target frame image F as the subject clipping region A.

In step S29, when it is determined that the size of the previously clipped subject clipping region A is not equal to or more than the double zoom size (step S29; NO), the image processing unit 5 determines whether to zoom out to the entire frame image F according to the previously specified condition (step S32).

Here, when it is determined to zoom out to the entire frame image F (step S32; YES), the image processing unit 5 determines whether the size of the previously clipped subject clipping region A is smaller than the size of the entire frame image F (step S33).

In step S33, when it is determined that the size of the previously clipped subject clipping region A is smaller than the size of the entire frame image F (step S33; YES), the region setting unit 5*d* sets the size of the entire frame image F as the goal size of the planned clipping region A0 newly clipped from the processing target frame image F (step S34). Next, the region setting unit 5*d* sets the center of gravity of the entire frame image F as the goal center of gravity of the newly clipped planned clipping region A0, and sets the center of gravity of the planned clipping region A0 newly clipped from the processing target frame image F based on the linear interpolation condition calculated in step S15 (step S35).

Then, the image processing unit 5 advances the processing to step S23, and performs the processing thereafter. In other words, in step S23, the region setting unit 5d sets the size of the planned clipping region A0 newly clipped from the processing target frame image F to be larger than the size of the previous subject clipping region A based on the linear interpolation condition calculated in step S15. In step S25, the position of the planned clipping region A0 is specified from the center of gravity and the size of the set planned clipping region A0.

Then, in step S26, the image clipping region 5e clips the planned clipping region A0 set by the region setting unit 5d from the processing target frame image F as the subject clipping region A.

In step S32, when it is determined not to zoom out to the entire frame image F (step S32; NO), or in step S33, when it is determined that the size of the previously clipped subject clipping region A is not smaller than the size of the entire frame image F (step S33; NO), the image processing unit 5 advances the processing to step S28 and performs the processing thereafter. In other words, in step S28, the region setting unit 5d sets the position and the size of the previously set planned clipping region A0 as the position and the size of the planned clipping region newly clipped from the processing target frame image F.

Then, the image processing unit 5 advances the processing to step S26, and performs the processing thereafter. In other words, in step S26, the image clipping region 5e clips the planned clipping region A0 set by the region setting unit 5d from the processing target frame image F as the subject clipping region A.

The image data of the subject clipping region A clipped from each frame image F is corresponded with the frame number of the processing target frame image F and output to the image recording unit 6, and is stored as the image data of a trimming moving image of the subject clipping region A clipped from the moving image.

As described above, according to the imaging apparatus 100 of the present embodiment, the planned clipping region A0 newly clipped from the processing target frame image F is set based on the position and the size of the subject clipping region A already clipped. Therefore, it is possible to clip the subject clipping region A from the processing target frame image F considering the position and the size of the subject clipping region A clipped from the frame image F before the processing target frame image F. In other words, for example, even if there is a drastic change in the number, the position, the size, etc. of the subject S detected from the moving image, the position and the size of the planned clipping region A0 can be interpolated and set considering the temporal change of the position and the size of the subject clipping region A already clipped, and the position and the size of the subject clipping region A actually clipped can be changed gradually between frame images F adjacent to each other. Specifically, when the subject clipping region A is clipped with the subject S detected in the moving image as the tracking target, it is possible to generate the moving image with the subject S in a more natural composition.

As described above, it is possible to suitably clip the subject clipping region A corresponding to the subject S from the moving image.

When the subject S is detected from the processing target frame image F, the planned clipping region A0 newly clipped from the processing target frame image F is set based on the position and the size of the detected subject S and the position and the size of the subject clipping region A clipped from the another frame image F before the processing target frame image F. Therefore, the planned clipping region A0 can be set by considering not only the position and the size of the subject clipping region A clipped from the frame image F before the processing target frame image F but also the position and the size of the subject S detected from the processing target frame image F. Consequently, the subject clipping region A can be suitably clipped from the processing target frame image F.

Specifically, when the plurality of subjects Ss are detected from the processing target frame image F, by considering the position and the size of the detected plurality of subjects Ss, even if the number of subjects Ss detected from the moving image drastically changes, the position and the size of the subject clipping region A actually clipped can be gradually changed between frame images F adjacent to each other.

Moreover, even if the subject S is not detected from the processing target frame image F, the planned clipping region A0 newly clipped from the processing target frame image F is set based on the position and the size of the subject clipping region A clipped from the another frame image F before the processing target frame image F. Therefore, even if the subject clipping region A not including the subject S is clipped, it is possible to gradually change the position and the size of the subject clipping region A between frame images F adjacent to each other.

Moreover, since the light emission (for example, light emission of the optical tag, etc.) of visible light of the subject S in the moving image is detected, the subject S can be suitably detected by using the emitted light. With this, it is possible to suitably track the subject S in the moving image.

The present invention is not limited to the embodiments described above, and various modifications and changes in design can be made on the present invention without leaving the scope of the present invention.

For example, according to the present embodiment, the newly clipped planned clipping region A0 is set based on the position and the size of the subject clipping region A already clipped. However, this is one example, and the present invention is not limited to the above. For example, the planned clipping region A0 can be set considering at least one of the position and the size of the subject clipping region A.

Further, the configuration of the imaging apparatus 100 is one example of the present invention, and the present invention is not limited to the above. Further, the imaging apparatus 100 is illustrated as one example of the image processing apparatus, but the present invention is not limited to this.

In addition, according to the above-described embodiments, the functions of the detecting unit, the clipping unit, and the setting unit are executed by driving the subject detecting unit 5b, the image clipping unit 5e, and the region setting unit 5d under the control of the central control unit 1. However, the present invention is not limited to the above, and the above functions can be executed by performing predetermined programs with a CPU of the central control unit 1.

In other words, a program including a detection processing routine, a clipping processing routine, and a setting processing routine is stored in the program memory (not shown) storing programs. The CPU of the central control unit 1 can execute the function of detecting the subject S in the moving image with the detecting processing routine. The CPU of the central control unit 1 can execute the function of clipping the subject clipping region A corresponding to the subject S detected from the frame images F composing the moving image with the clipping processing routine. The CPU of the central control unit 1 can execute the function of setting the planned clipping region A0 newly clipped based on at least one of the position and the size of the subject clipping region A already clipped with the setting processing routine.

Similarly, the CPU of the central control unit 1 can execute a predetermined program to perform the functions of the determining unit.

As the computer-readable medium storing the program to perform the above processing, in addition to a ROM, hard disk, etc., a nonvolatile memory such as a flash memory or a portable storage medium such as a CD-ROM can be applied. Moreover, a carrier wave can be applied as a medium providing program data through a predetermined communication line.

Although various exemplary embodiments have been shown and described, the invention is not limited to the embodiments shown. Therefore, the scope of the invention is intended to be limited solely by the scope of the claims that follow and its equivalents.

What is claimed is:

1. An image processing apparatus comprising:
   a detecting unit which detects a subject in a moving image;
   a clipping unit which clips a region corresponding to the subject detected by the detecting unit from each frame image composing the moving image; and
   a setting unit which sets a planned clipping region to be newly clipped by the clipping unit based on at least one of a position and a size of a region corresponding to the subject which is the region already clipped by the clipping unit and a region corresponding to the subject which is the region to be clipped by the clipping unit, wherein,
   the setting unit sets a region corresponding to the subject adding a play region on an outer side of the subject from a center of gravity of the subject as a center considering a shake occurring when the subject is imaged; and
   a size of the added play region may be changed according to the position and the size of the region corresponding to the subject or is a certain size.

2. The image processing apparatus according to claim 1, wherein, the setting unit interpolates and sets a position of the planned clipping region based on temporal change of the position of the region corresponding to the subject already clipped by the clipping unit.

3. The image processing apparatus according to claim 1, wherein, the setting unit interpolates and sets a size of the planned clipping region based on temporal change of the size of the region corresponding to the subject already clipped by the clipping unit.

4. The image processing apparatus according to claim 1, wherein, the setting unit sets the planned clipping region based on the region corresponding to the subject detected by the detecting unit, and temporal change of the position and the size of the region corresponding to the subject already clipped by the clipping unit.

5. The image processing apparatus according to claim 1, further comprising:
   a determining unit which determines whether the detecting unit detected the subject from one frame image composing the moving image,
   wherein, when the determining unit determines that the subject is detected, the setting unit sets the planned clipping region newly clipped from the one frame image by the clipping unit based on the position and the size of the subject detected by the detecting unit from the one frame image, and the position and the size of the region corresponding to the subject clipped by the clipping unit from another frame image composing the moving image before the one frame image.

6. The image processing apparatus according to claim 5, wherein, when a plurality of subjects are detected by the detecting unit, the setting unit sets the planned clipping region based on the position and the size of the plurality of subjects detected by the detecting unit from the one frame image, and the position and the size of the region corresponding to the subject clipped by the clipping unit from the another frame image.

7. The image processing apparatus according to claim 5, wherein, when the determining unit determines the subject is not detected, the setting unit sets the planned clipping region based on the position and the size of the region corresponding to the subject clipped by the clipping unit from the another frame image.

8. The image processing apparatus according to claim 1, wherein, the detecting unit detects the subject including the subject as a tracking target in the moving image.

9. The image processing apparatus according to claim 1, wherein,
   an optical tag which emits visible light is attached to the subject; and
   the detecting unit detects the optical tag which emits light in a predetermined color pattern or a predetermined light pattern in the moving image to detect the subject.

10. An image processing method using an image processing apparatus, the method comprising:
    detecting a subject in a moving image;
    clipping a region corresponding to the subject detected from each frame image composing the moving image; and
    setting a planned clipping region to be newly clipped based on at least one of a position and a size of a region corresponding to the subject which is the region already clipped by the clipping unit and a region corresponding to the subject which is the region to be clipped by the clipping unit, wherein,
    setting a region corresponding to the subject comprises adding a play region on an outer side of the subject from a center of gravity of the subject as a center considering a shake occurring when the subject is imaged; and
    allowing a size of the added play region to be changed according to the position and the size of the region corresponding to the subject or is a certain size.

11. A non-transitory computer-readable storage medium having a program stored thereon for controlling a computer to perform image processing performed in an image processing apparatus, wherein the program controls the computer to perform the functions of:
    a detecting unit which detects a subject in a moving image;
    a clipping unit which clips a region corresponding to the subject detected by the detecting unit from each frame image composing the moving image; and a setting unit which sets a planned clipping region to be newly clipped by the clipping unit based on at least one of a position and a size of a region corresponding to the subject which is the region already clipped by the clipping unit and a region corresponding to the subject which is the region to be clipped by the clipping unit, wherein, the setting unit sets a region corresponding to the subject adding a play region on an outer side of the subject from a center of gravity of the subject as a center considering a shake occurring when the subject is imaged; and a size of the added play region may be changed according to the position and the size of the region corresponding to the subject or is a certain size.

12. The image processing apparatus according to claim 8, wherein, the detecting unit detects the subject as the tracking target in a first frame image which is before a second frame image based on position information of the subject detected from the second frame image among a plurality of frame images composing the moving image or image information including luminance information and color information of the region including the subject.

13. The image processing apparatus according to claim 9, wherein, the detecting unit detects an optical tag and specifies a detecting position of the subject, performs face detecting processing on each frame image with reference to the specified detecting position of the optical tag, and detects a position of the subject and a region including the subject from the frame images.

14. The image processing apparatus according to claim 1, wherein, the setting unit determines whether there is a predetermined position in the region corresponding to the subject already clipped by the clipping region and changes a setting of the planned clipping region newly clipped by the clipping unit according to whether there is the predetermined position.

15. The image processing apparatus according to claim 1, wherein, the setting unit determines whether there is a center of gravity of the region corresponding to the subject clipped from a first frame image which is one frame image before a second frame image among a plurality of frame images composing the moving image in the detected region corresponding to the subject;

when the setting unit determines there is the center of gravity of the region corresponding to the subject clipped from the first frame image in the region corresponding to the subject, the setting unit sets the center of gravity of the region corresponding to the subject clipped from the first frame image as the center of gravity of the planned clipping region newly clipped from the second frame image;

when the setting unit determines the center of gravity of the region corresponding to the subject clipped from the first frame image is not in the region corresponding to the subject, the setting unit sets the center of gravity of the planned clipping region newly clipped from the second frame image based on a linear interpolation condition.

16. The image processing apparatus according to claim 15, wherein, the setting unit determines whether there is the center of gravity of the region corresponding to the subject clipped from the first frame image in the play region of the detected region corresponding to the subject when the play region is added to the region corresponding to the subject.

17. The image processing apparatus according to claim 15, wherein, the setting unit determines whether the region corresponding to the subject clipped from the first frame image exists entirely in the detected region corresponding to the subject.

18. The image processing apparatus according to claim 1, wherein, the setting unit determines whether a size of the region corresponding to the subject to be clipped by the clipping unit is larger than a size of the region corresponding to the subject already clipped by the clipping unit, and changes a size of the planned clipping region newly clipped by the clipping unit according to which of the above is larger.

19. The image processing apparatus according to claim 1, wherein, the setting unit determines whether the size of the detected region corresponding to the subject is larger than the size of the region corresponding to the subject clipped from a first frame image which is one frame image before a second frame image among a plurality of frame images composing the moving image;

when the setting unit determines that the size of the region corresponding to the subject is larger than the size of the region corresponding to the subject clipped from the first frame image, the setting unit sets the size of the planned clipping region newly clipped from the second frame image to be larger than the size of the region corresponding to the subject clipped from the first frame image based on a linear interpolation condition; and when the setting unit determines that the size of the region corresponding to the subject is larger than the size of the region corresponding to the subject clipped from the first frame image, the setting unit sets the size of the planned clipping region newly clipped from the second frame image to be not larger than the size of the region corresponding to the subject clipped from the first frame image based on the linear interpolation condition.

20. The image processing apparatus according to claim 19, wherein, when the setting unit determines that the size of the region corresponding to the subject is a same size as the size of the region corresponding to the subject clipped from the first frame image, the setting unit sets the size of the planned clipping region newly clipped from the second frame image to be a same size as the size of the region corresponding to the subject clipped from the first frame image.

21. The image processing apparatus according to claim 1, wherein, the setting unit sets the planned clipping region so that an aspect ratio of the region corresponding to the subject clipped from the frame images composing the moving image is a certain value.

22. The image processing apparatus according to claim 1, wherein, when the setting unit sets the planned clipping region to be outside an edge due to a center of gravity of the set planned clipping region being close to the edge of the frame image, the setting unit sets the planned clipping region moved in a direction away from the edge of the frame image while maintaining an aspect ratio of the planned clipping region.

23. An image processing apparatus comprising:
a detecting unit which detects a subject in a moving image;
a clipping unit which clips a region corresponding to the subject detected by the detecting unit from each frame image composing the moving image; and a setting unit which sets a planned clipping region to be newly clipped by the clipping unit based on at least one of a position and a size of a region corresponding to the subject which is the region already clipped by the clipping unit and a region corresponding to the subject which is the region to be clipped by the clipping unit, wherein, the setting unit determines whether there is a center of gravity of the region corresponding to the subject clipped from a first frame image which is one frame image before a second frame image among a plurality of frame images composing the moving image in the detected region corresponding to the subject;

when the setting unit determines there is the center of gravity of the region corresponding to the subject clipped from the first frame image in the region corresponding to the subject, the setting unit sets the center of gravity of the region corresponding to the subject clipped from the first frame image as the center of gravity of the planned clipping region newly clipped from the second frame image;

when the setting unit determines the center of gravity of the region corresponding to the subject clipped from the first frame image is not in the region corresponding to the subject, the setting unit sets the center of gravity of the planned clipping region newly clipped from the second frame image based on a linear interpolation condition.

24. An image processing method using an image processing apparatus, the method comprising:
   detecting a subject in a moving image;
   clipping a region corresponding to the subject detected from each frame image composing the moving image; and
   setting a planned clipping region to be newly clipped based on at least one of a position and a size of a region corresponding to the subject which is the region already clipped by the clipping unit and a region corresponding to the subject which is the region to be clipped by the clipping unit, wherein,
   said setting comprises determining whether there is a center of gravity of the region corresponding to the subject clipped from a first frame image which is one frame image before a second frame image among a plurality of frame images composing the moving image in the detected region corresponding to the subject;
   when it is determined that there is the center of gravity of the region corresponding to the subject clipped from the first frame image in the region corresponding to the subject, said setting further comprises setting the center of gravity of the region corresponding to the subject clipped from the first frame image as the center of gravity of the planned clipping region newly clipped from the second frame image;
   when it is determined that the center of gravity of the region corresponding to the subject clipped from the first frame image is not in the region corresponding to the subject, said setting further comprises setting the center of gravity of the planned clipping region newly clipped from the second frame image based on a linear interpolation condition.

25. A non-transitory computer-readable storage medium having a program stored thereon for controlling a computer to perform image processing performed in an image processing apparatus, wherein the program controls the computer to perform the functions of:
   a detecting unit which detects a subject in a moving image;
   a clipping unit which clips a region corresponding to the subject detected by the detecting unit from each frame image composing the moving image; and
   a setting unit which sets a planned clipping region to be newly clipped by the clipping unit based on at least one of a position and a size of a region corresponding to the subject which is the region already clipped by the clipping unit and a region corresponding to the subject which is the region to be clipped by the clipping unit, wherein,
   the setting unit determines whether there is a center of gravity of the region corresponding to the subject clipped from a first frame image which is one frame image before a second frame image among a plurality of frame images composing the moving image in the detected region corresponding to the subject;
   when the setting unit determines there is the center of gravity of the region corresponding to the subject clipped from the first frame image in the region corresponding to the subject, the setting unit sets the center of gravity of the region corresponding to the subject clipped from the first frame image as the center of gravity of the planned clipping region newly clipped from the second frame image;
   when the setting unit determines the center of gravity of the region corresponding to the subject clipped from the first frame image is not in the region corresponding to the subject, the setting unit sets the center of gravity of the planned clipping region newly clipped from the second frame image based on a linear interpolation condition.

* * * * *